United States Patent Office 3,428,608
Patented Feb. 18, 1969

3,428,608
THERMAL STABILITY TREATMENT OF OXY-
METHYLENE POLYMERS WITH ETHYLENE
IMINE GROUP-CONTAINING COMPOUNDS
James Hofton, Stonnall, near Walsall, William Henry
Vickers, Sutton Coldfield, and Anthony Woodward,
Smethwick, England, assignors, by mesne assignments,
to British Industrial Plastics Limited, Manchester,
England
No Drawing. Filed Aug. 13, 1965, Ser. No. 479,654
Claims priority, application Great Britain, Aug. 18, 1964,
33,685/64; Nov. 23, 1964, 47,554/64
U.S. Cl. 260—67.5          23 Claims
Int. Cl. C08g 9/24

ABSTRACT OF THE DISCLOSURE

A process for improving the thermal stability of oxymethylene copolymers comprises reacting the copolymers at temperatures above 130° C. with ethylene imine group-containing compounds.

---

This invention relates to oxymethylene copolymers and is concerned with producing oxymethylene copolymers having improved thermal stability such as to render them more suitable for procedures such as extrusion, injection and compression moulding.

By the term "oxymethylene copolymers" as used herein we means high molecular weight copolymers containing in the polymer chain a majority of oxymethylene, —CH$_2$O—, units and also units of the formula $\pm$C$\pm_n$, where $n$ is a whole number having a value of at least 2, other than those containing a carbonyl group, —CO—, in the chain. Such polymers may be prepared, for example, by the copolymerisation of formaldehyde or trioxan in the presence of electrophilic or cationic catalysts such as Lewis acids with such comonomers as cyclic ethers and acetals, vinyl compounds such as vinyl ethers and vinyl aliphatic and alicyclic hydrocarbons, styrene and styrene derivatives, allyl compounds, aldehydes, and N-vinyl and C-vinyl heterocyclic compounds.

Examples of suitable comonomers include textroxan, dioxolan tetrahydrofuran, 3,3 - bis(chloromethyl) - oxacyclobutane, styrene oxide, propylene oxide, 1,3,5-trioxepan, 1,3-dioxepan, ethylene oxide; styrene, α-methyl styrene, α-phenyl styrene, o-, m- and p-methyl styrenes, anethole, 1-vinyl naphthalene, 2-vinyl naphthalene, stilbene, indene, coumarone, acenaphthylene; chloral, benzaldehyde, anisaldehyde, cinnamaldehyde, piperonal, butyraldehyde; allyl acetate, allyl ethyl ether, allyl bromide, allyl methacrylate, allyl Cellosolve, allyl cyanide, allyl benzene, allyl glycidyl ether, allyl alcohol, allyl betacyclohexyl propionate, allyl phenyl ether, diallyl phenyl phosphate; isobutene, butadiene, isoprene, pentadiene-1,3, cyclohexene, heptene-1, octene-1, cyclopentadiene, 4-vinyl cyclohexane beta-pinene; methyl vinyl ether, ethyl vinyl ether, n-butyl vinyl ether, isobutyl vinyl ether, vinyl 2-ethyl hexyl ether, phenyl vinyl ether; vinyl acetate; N-vinyl carbazole, 2-vinylpyridine and 2-vinyl-1,3-dioxan. Normally these other comonomers will make up between 0.01 and 50% of the units of the polymer, preferably between 0.1 and 20%.

According to the present invention, a process for improving the thermal stability of an oxymethylene copolymer as hereinabove defined comprises reacting the copolymer with a compound containing the group

Suitable examples of compounds containing this characteristic group are ethylene imine itself and polyethyleneimine, of the formula

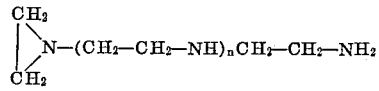

This is commercially available as aqueous solutions of different average molecular weights, e.g., a 50% aqueous solution of 1000–5000 molecular weight, a 33% solution of 40,000–60,000 molecular weight, and a 33% solution of 50,000–100,000 molecular weight. When used in the process of the invention, this solution is preferably diluted with a solvent for the oxymethylene copolymer which is also miscible with water, after which the water is distilled off to leave a solution of polyethyleneimine in the solvent for the polymer.

Other compounds containing the

group are the ethylene ureas obtained by reacting isocyanates with ethyleneimine, e.g. 1,6-hexamethylene-di (N,N'-ethylene urea) of the formula

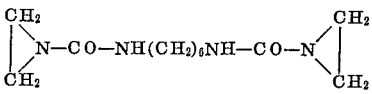

obtained from ethyleneimine and hexamethylene diisocyanate.

A further suitable compound is the substituted triazine prepared from cyanuric chloride and ethylene imine, and having the formula

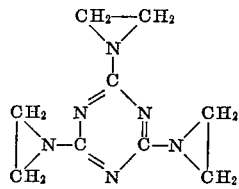

Other examples of compounds containing the group

which may be used in this invention are ethylene urea, of formula

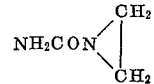

4,4'-diphenyl-methane di(N,N-ethylene urea),

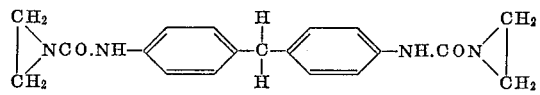

and phosphoric triethylene imide,

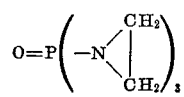

The enhanced thermal stability of the polymers produced in accordance with the invention is due to endgroup blocking, i.e. blocking of the thermally unstable end-groups on the polymer chain. The process of the invention is particularly useful when the polymer end groups are hydroxyl groups. The ethyleneimine ring is very susceptible to ring opening and is consequently chemically reactive.

Polyoxymethylene homopolymers without end-group blocking and also copolymers containing carbonyl groups are susceptible to alkaline hydrolysis. The copolymers with which the present invention is concerned, e.g. copolymers of trioxan and cyclic ethers and trioxan and styrene, are much more resistant to alkalis but nevertheless a proportion is degraded leaving a residue which is more stable thermally. Since the compounds containing the group

are weak alkalis, this reaction can also occur as a side reaction and part of the polymer is hydrolysed rather than end-grouped blocked.

However, the proportion of polymer remaining after this treatment is greater than after alkaline treatment in solution by a compound incapable of end-group blocking, and moreover the product obtained is more stable thermally than after such treatment.

Copolymers of trioxan and styrene are very suitable for treatment according to the invention. So also are copolymers of trioxan and cyclic ethers, copolymers of trioxan and vinyl compounds, and copolymers of trioxan and allyl compounds.

A particular advantage of the use of the stabilisers of the invention is that no other compound is required to catalyse the end-group blocking reaction. Additional advantages are that the molecular weight of the polymer remains substantially constant during the reaction.

The stabiliser is normally used in an amount of 0.01 to 20% by weight of the polymer, the preferred amount being 0.5 to 10% on the same basis. However, good results can be obtained with smaller amounts.

The treatment is preferably effected in a liquid medium, and in this case it is necessary for the polymer to be in solution before such treatment is fully effective in improving the thermal stability. It is also preferable for the

compound to be in solution. Suitable solvents for use in this method of carrying out the invention include dimethyl formamide, benzyl alcohol, tetramethylene sulphone and bis-(2-methoxy-ethyl) ether. A convenient way of carrying out the treatment is to heat the polymer and the

compound in a suitable solvent at the solution temperature of the system for a period of time of a few e.g. five, minutes to 4 hours, the time of reaction depending, inter alia, upon the concentration of stabiliser used, and being readily determinable for optimum results under a given set of conditions.

Thus, as an example, a mixture of a trioxan-styrene copolymer, dimethyl formamide and, say, polyethyleneimine may be heated at a temperature of 130 to 150° C. for a period of 1 to 3 hours, during which the copolymer will go into solution and will undergo reaction with the imine. It may then be precipitated by cooling or by addition of water. The treated polymer may be redissolved and then reprecipitated without the thermal stability being affected, showing there has been true reaction and not simple mixture with the polyethyleneimine.

The polymer obtained after treatment according to the present invention may then, if desired, be stabilised further by the addition of known stabilisers for the polymer. These include antioxidants, such as aromatic amines, bis- and ter-phenols, and stabilisers such as monomeric and polymeric trivalent nitrogen compounds.

The invention is illustrated by means of the following examples, in which the $W^x_{222}$ value is the weight percent loss, on heating at 222° C. in an open vessel in air for $x$ minutes, of a sample of film compression moulded at 190° C. from the polymer.

Example 1

A trioxan-styrene copolymer was prepared by the copolymerisation of trioxan and styrene in cyclohexane at 60° C. using a triethyl oxonium salt as catalyst. 10 g. of this copolymer, 67 ml. (64 g.) dimethyl formamide and 2.5 ml. (2.07 g.) ethylene imine were added to a flask fitted with a thermometer, stirrer, condenser and outlet for removing samples from the flask from time to time. The flask and contents were heated until the solution started to reflux at about 150° C.

The solution was maintained at reflux temperature for 1½ hours, samples being taken at ½ and 1½ hours. The samples after removal were poured into about 40 g. water to precipitate the polymer, which in each case was washed thoroughly in water with high speed stirring until the washings on filtration were neutral and was finally slurried in acetone.

The samples were filtered and dried at 60° C. in a vacuum oven. The yield of polymer recovered and the thermal stability, as measured by $W^x_{222}$ values on polymer films compression moulded at 190° C., are given in Table I below.

For comparison, a trioxan-styrene copolymer similar to that used in Example 1 was treated in an identical fashion but in the absence of ethylene imine, and the results for a sample taken after 1 hour are also given in Table I.

Example 2

A trioxan-styrene copolymer, prepared as in Example 1, was treated in an identical manner to that described in Example 1 except that 0.6 ml. (0.50 g.) ethylene imine was used and the reactants were maintained at 125–130° C. for 1 hour and at reflux temperature for a further 1 hour. Samples were taken after 1 and 2 hours, and treated as in Example 1. The yield of polymer recovered and the thermal stability thereof are given in Table I.

Example 3

A trioxan-styrene copolymer, prepared as in Example 1, was treated in an identical manner to that described in Example 1 except that 0.15 ml. (0.125 g.) ethylene imine was used and the reactants were maintained at 120° C. for 1½ hours and at reflux temperature for a further 1 hour. A sample was taken after 2½ hours, and treated as in Example 1. The yield of polymer recovered and the thermal stability thereof are given in Table I.

Example 4

A trioxan-styrene copolymer, prepared as in Example 1, was treated in an identical manner to that described in Example 1 except that 0.012 ml. (0.010 g.) ethylene imine was used and the reactants were maintained at 125–130° C. for 1 hour and at reflux temperature for a further 1 hour. A sample was taken after 2 hours, and treated as in Example 1. The yield of polymer recovered and the thermal stability thereof are given in Table I.

TABLE I

| Example | Yield of polymer | Thermal stability of moulded films | | |
|---|---|---|---|---|
| | | $W^{10}_{222}$ | $W^{30}_{222}$ | $W^{60}_{222}$ |
| 1 | Initially | 6.6 | 14.4 | 23 |
| | 69% after ½ hour | 0.6 | 2.3 | 4.7 |
| | 67% after 1½ hour | 0.6 | 2.0 | 3.8 |
| 2 | Initially | 7.0 | 15.6 | 24 |
| | 96% after 1 hour | 4.8 | 15.3 | 22 |
| | 81% after 2 hours | 0.4 | 1.8 | 5.8 |
| 3 | Initially | 5.1 | 12.3 | 20 |
| | 87% after 2½ hours | 0.6 | 4.8 | 9.3 |
| 4 | Initially | 7.0 | 15.6 | 24 |
| | 98% after 2 hours | 3.2 | 10.9 | |
| Without ethylene imine | Initially | 4.7 | 13.3 | |
| | 85% after 1 hour | 5.0 | 11.5 | 17.8 |

Example 5

3 parts of a 50% aqueous solution of polyethyleneimine were diluted with 2 parts dimethyl formamide to give a 30% solution in the mixed solvent, and the water was distilled off. The residual solution of polyethyleneimine in dimethyl formamide was used for the purposes of the experiment.

10 g. of a trioxan-styrene copolymer, 67 ml. dimethyl formamide, and 0.5 g. of the above solution of polyethyleneimine were heated in a reaction vessel, fitted with a condenser and thermometer, at 120° C. for 2 hours. The temperature was raised until the reflux temperature was reached (about 150° C.), when the copolymer went into solution. The solution was maintained under these conditions for a further 1 hour, when the reaction was terminated by transferring the solution into water and causing the copolymer to precipitate out. The copolymer was washed by high speed agitation with water until the washings were neutral, and subsequently with acetone.

The copolymer was dried in a vacuum oven at 60° C. The yield of polymer recovered was ascertained and the thermal stability determined by the method described above. The results obtained, along with those in the untreated polymer and those of Examples 6, 7, 8 and 9 are given in Table II below.

Example 6

Example 5 was repeated with the exception that, in place of 0.5 g. of the polyethyleneimine solution, only 0.25 g. was used.

Example 7

Example 5 was again repeated with the exception that, in place of the 0.5 g. polyethyleneimine solution, only 0.02 was used.

Example 8

This was also carried out in a manner similar to that described in Example 5, but using 0.5 g. of 1.6-hexamethylene di(N,N'-ethylene urea) instead of the polyethyleneimine.

Example 9

Example 8 was repeated with the exception that only 0.2 g. of the substituted imine was used.

TABLE II

| Example | Yield of Polymer recovered, percent | Thermal stability of moulded film | | |
|---|---|---|---|---|
| | | $W^{10}_{222}$ | $W^{30}_{222}$ | $W^{60}_{222}$ |
| Untreated | | 5.1 | 12.3 | 20 |
| 5 | 78 | 1.8 | 5.3 | 11.3 |
| 6 | 88 | 2.0 | 5.8 | 10.5 |
| 7 | 100 | 3.6 | 9.5 | 16.8 |
| 8 | 84 | 1.7 | 5.3 | 10.6 |
| 9 | 84 | 1.8 | 5.6 | |

Example 10

10 g. of a copolymer of trioxan and 3% styrene, 70 g. benzyl alcohol and 0.5 g. ethylene imine were heated together at 120° C. for 1½ hours and then refluxed for 1 hour. The solution was then blown into about 40 g. toluene and the polymer precipitated. It was washed with acetone, then with water, and again with acetone and finally dried at 60° C. giving a yield of 79%. The stability was determined as described above, and the results were as follows:

| | $W^{10}_{222}$ | $W^{30}_{222}$ | $W^{60}_{222}$ |
|---|---|---|---|
| Untreated | 7.0 | 15.6 | 23.6 |
| Treated | 2.0 | 6.8 | 14.6 |

Example 11

10 g. of a copolymer of trioxan and 3% 1,3-dioxolan, 63 g. dimethyl formamide and 0.1 g. ethylene imine were heated together at 120° C. for 2 hours, then refluxed for 1 hour. The product was then treated as in Example 5, giving a yield of 99%. The thermal stabilities of treated and untreated polymer were:

| | $W^{10}_{222}$ | $W^{30}_{222}$ | $W^{60}_{222}$ |
|---|---|---|---|
| Before treatment | 2.7 | 12.3 | 35 |
| After treatment | 0.3 | 1.8 | 3.8 |

For comparison, the same polymer was treated in dimethyl formamide solution with 2% sodium carbonate for 1 hour. The yield was 96% of a less stable polymer, the corresponding thermal stability figures being 1.7, 6.9, 14.8.

Example 12

10 g. of a copolymer of trioxan and 3% styrene, 63 g. dimethyl formamide and 0.2 g. of the triethylene imide of phosphoric acid were refluxed ½ hour and the polymer recovered as in the previous examples. The yield of stabilised polymer was 86%.

Example 13

10 g. of a copolymer of trioxan and 3% styrene, 63 g. dimethyl formamide and 1 g. N,N-ethylene urea were refluxed for 1½ hours, and the polymer was recovered as in Example 11 in a yield of 63%.

| | $W^{10}_{222}$ | $W^{30}_{222}$ | $W^{60}_{222}$ |
|---|---|---|---|
| Before treatment | 10.4 | 22.1 | 30 |
| After treatment | 0.2 | 1.7 | 2.3 |

Example 14

Example 13 was repeated using 0.05 g. of 4,4'-diphenyl-methane di(N,N-ethylene urea) instead of the ethylene urea. The yield was 69% and the corresponding values of thermal stability after treatment 1.2, 4.1, 10.5.

What is claimed is:

1. A process for improving the thermal stability of an oxymethylene copolymer consisting of a majority of oxymethylene units and a smaller proportion of oxyalkylene units having at least two adjacent carbon atoms, which comprises reacting the copolymer with from 0.01 to 20%, based on the weight of the copolymer, of a compound containing the group

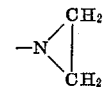

the reaction being effected in solution at a temperature above 130° C.

2. A process according to claim 1 wherein the copolymer is reacted with ethylene imine.

3. A process according to claim 1 wherein the copolymer is reacted with an N-substituted ethylene imine.

4. A process according to claim 3 wherein the copolymer is reacted with polyethylene imine.

5. A process according to claim 3 wherein the copolymer is reacted with 1,6-hexamethylene-di(N,N'-ethylene urea).

6. A process according to claim 3 wherein the copolymer is reacted with the compound of the formula

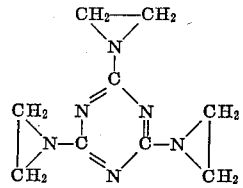

7. A process according to claim 3 wherein the copolymer is reacted with ethylene urea.

8. A process according to claim 3 wherein the copolymer is reacted with 4,4'-diphenyl-methane di(N,N-ethylene urea).

9. A process according to claim 3 wherein the copolymer is reacted with phosphoric triethylene imide.

10. A process for improving the thermal stability of an oxymethylene copolymer consisting of a majority of oxymethylene units and a smaller proportion of units of the formula $(C)_n$, wherein $n$ is a whole number having a value of at least 2, which comprises reacting the copolymer with from 0.01 to 20%, based on the weight of the copolymer, of a compound containing the group

the reaction being effected in solution at a temperature about 130° C.

11. A process according to claim 1 wherein the solvent is a compound selected from the class consisting of dimethyl formamide, benzyl alcohol, tetramethylene sulphone and bis(2-methoxyethyl) ether.

12. A process according to claim 11 wherein the copolymer is reacted in solution at a temperature of 130–150° C. for a period of a few minutes to 3 hours.

13. A process according to claim 1 wherein, after reaction with the compound containing the group

the copolymer is admixed with a compound selected from the class consisting of aromatic amines, bis- and terphenols, and monomeric and polymeric tervalent nitrogen compounds.

14. A process according to claim 1 wherein the copolymer is a trioxan-cyclic ether copolymer.

15. A process according to claim 10 wherein the copolymer is a trioxane-vinyl compound copolymer.

16. A process according to claim 1 for improving the thermal stability of a trioxan-styrene copolymer which consists essentially in refluxing, for a period of about one and a half hours, a mixture of trioxane-styrene copolymer, dimethyl formamide and ethylene imine, and recovering the copolymer.

17. A process according to claim 1 for improving the thermal stability of a trioxan-styrene copolymer which consists essentially in heating, at a temperature of 120° C. for 2 hours, a mixture of the copolymer, dimethylformamide and polyethylene imine, raising the temperature to reflux, refluxing for one hour, and recovering the copolymer.

18. A process according to claim 1 for improving the thermal stability of a trioxan-styrene copolymer which consists essentially in heating, at a temperature of 120° C. for 2 hours, a mixture of the copolymer, dimethyl formamide and 1,6 - hexamethylene di(N,N' - ethylene urea), raising the temperature to reflux, refluxing for one hour, and recovering the copolymer.

19. A process according to claim 1 for improving the thermal stability of a trioxan-styrene copolymer which consists essentially in heating together a mixture of the copolymer, benzyl alcohol and ethylene imine at 120° C. for 1½ hours, refluxing the reactants for 1 hour, blowing the resulting solution into toluene, and recovering the precipitated copolymer.

20. A process according to claim 1 for improving the thermal stability of a trioxan-1,3-dioxolan copolymer which consists essentially in heating together the copolymer, dimethyl formamide and ethylene imine at 120° C. for 2 hours, refluxing the reactants for 1 hour, pouring the resulting solution into water, and recovering the precipitated copolymer.

21. A process according to claim 1 for improving the thermal stability of a trioxan-styrene copolymer which consists essentially in refluxing a mixture of the copolymer, dimethyl formamide and phosphoric triethylene imide for ½ hour, and recovering the copolymer.

22. A process according to claim 1 for improving the thermal stability of a trioxan-styrene copolymer which consists essentially in refluxing a mixture of the copolymer, dimethyl formamide and N,N-ethylene urea for 1½ hours, and recovering the copolymer.

23. A process according to claim 1 for improving the thermal stability of a trioxan-styrene copolymer which consists essentially in refluxing a mixture of the copolymer, dimethyl formamide and 4,4'-dimethylmethane di-(N,N-ethylene urea) for 1½ hours, and recovering the resulting copolymer.

References Cited
UNITED STATES PATENTS

| | | | |
|---|---|---|---|
| 2,296,225 | 9/1942 | Ulrich | 260—72 |
| 3,119,790 | 1/1964 | Tsou | 260—67.5 |
| 3,133,896 | 5/1964 | Dolce | 260—45.9 |
| 3,288,757 | 11/1966 | Cambridge et al. | 260—73 |
| 3,299,005 | 1/1967 | Kiss | 260—67.5 |
| 3,316,207 | 4/1967 | Hermann et al. | 260—45.9 |
| 3,260,702 | 7/1966 | Murakami et al. | 260—45.8 |

WILLIAM H. SHORT, *Primary Examiner.*

E. M. WOODBERRY, *Assistant Examiner.*

U.S. Cl. X.R.

260—67.6, 72, 72.5, 73, 45.8, 45.9